United States Patent [19]

Hattori

[11] Patent Number: 5,019,412
[45] Date of Patent: May 28, 1991

[54] METHOD AND APPARATUS FOR MANUFACTURING DRIED FOODS

[75] Inventor: Ryuichi Hattori, Kyoto-fu, Japan

[73] Assignee: House Food Industrial Co., Ltd., Japan

[21] Appl. No.: 352,179

[22] Filed: May 15, 1989

Related U.S. Application Data

[63] Continuation of Ser. No. 238,052, Aug. 30, 1988, abandoned.

[30] Foreign Application Priority Data

Sep. 1, 1987 [JP] Japan .................. 62-218863

[51] Int. Cl.⁵ .............. A23L 1/00; H05B 6/00
[52] U.S. Cl. .................. 426/242; 99/451; 219/10.55 E; 219/10.55 M; 426/438
[58] Field of Search .............. 426/242, 438, 243; 99/403, DIG. 14, 451; 34/15, 92; 219/10.55 E, 10.55 M

[56] References Cited

U.S. PATENT DOCUMENTS

| | | | |
|---|---|---|---|
| 4,580,024 | 4/1986 | Thomas | 99/DIG. 14 |
| 4,593,170 | 6/1986 | Maeda et al. | 99/403 |
| 4,828,859 | 5/1989 | Imai | 426/438 |

FOREIGN PATENT DOCUMENTS

| | | | |
|---|---|---|---|
| 3233819 | 3/1984 | Fed. Rep. of Germany | 426/242 |
| 59-21355 | 2/1984 | Japan . | |
| 61-260864 | 11/1986 | Japan | 426/242 |

OTHER PUBLICATIONS

Geddes, Uses for Microwave, Food Engineering, Apr. 1967 (pp. 63-65).

Primary Examiner—George Yeung
Attorney, Agent, or Firm—Mason, Fenwick & Lawrence

[57] ABSTRACT

A method and an apparatus which can manufacture dried foods giving the person who eats the dried foods a soft-dried and spongy feeling pleasant to the palate by evaporating the greater part of the moisture in the raw materials to be removed in as short a time as possible after the commencement of the drying process. According to the present invention, this is achieved by a method for manufacturing dried foods wherein raw food materials are radiated with microwaves under reduced pressure conditions while immersed in oil as well as by an apparatus for manufacturing dried foods comprising an oil tank arranged within a pressure reducing chamber having a pressure reducing device; a retainer for containing raw food materials immersed in oil in said oil tank; and a microwave radiating device for radiating said raw food materials with microwave while immersed in the oil.

13 Claims, 1 Drawing Sheet

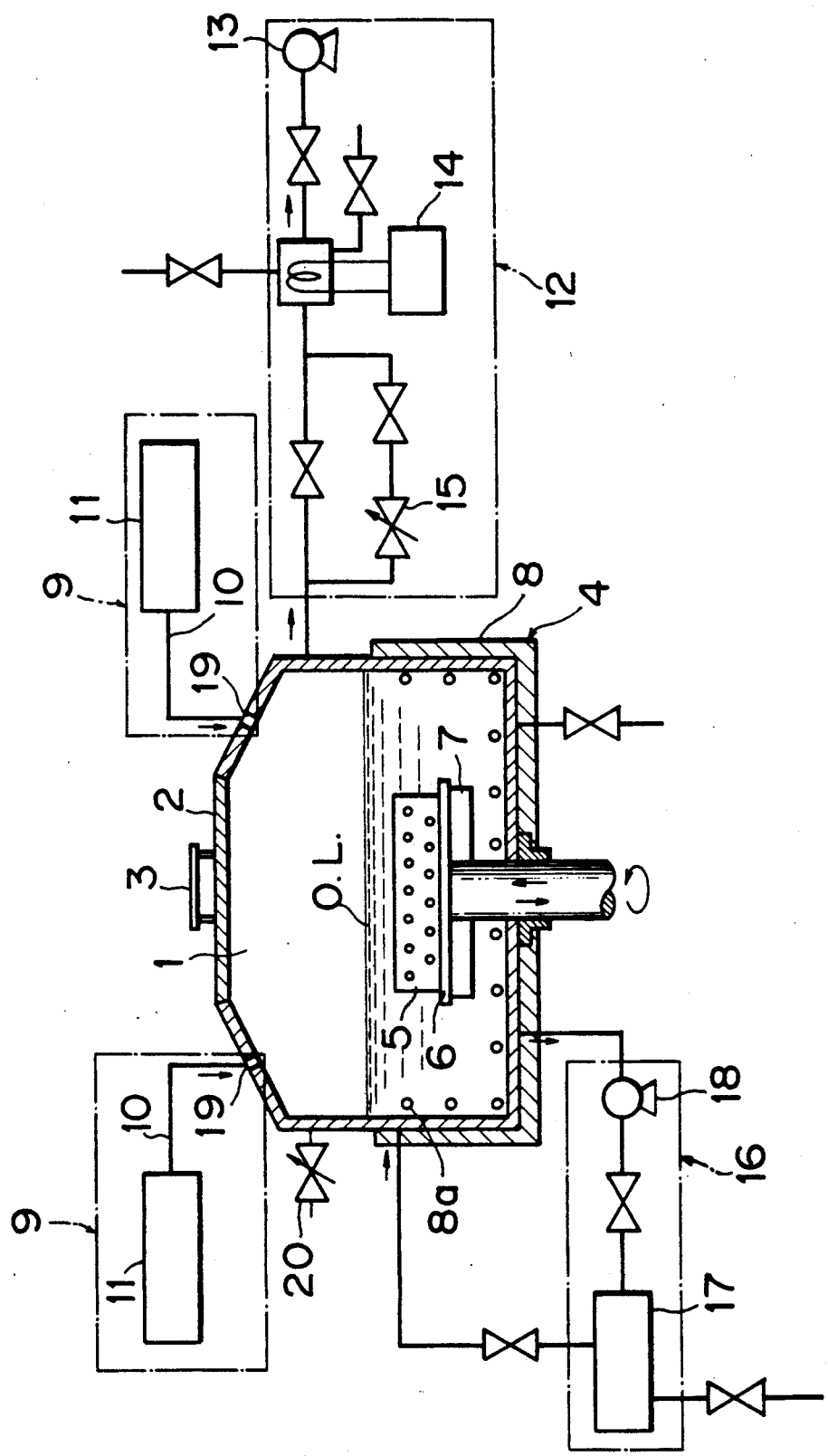
FIG. I

METHOD AND APPARATUS FOR MANUFACTURING DRIED FOODS

This application is a Continuation of application Ser. No. 238,052 filed Aug. 30, 1988, now abandoned.

BACKGROUND OF THE INVENTION

The present invention relates to a method and an apparatus for manufacturing dried foods.

Recently, dried foods in which the original color and flavor of the raw materials remains and which gives to a person who eats the dried foods a "soft-dried and spongy" feeling pleasant to the palate, have been very popular as high-quality confectionery.

In order to provide dried foods with a "soft-dried and spongy" feeling pleasant to the palate, it is preferable to make the dried foods as porous as possible. Accordingly, it is necessary to evaporate the greater part of the moisture which is contained in the raw materials and is intended to be removed in as short time as possible after the commencement of drying process.

Heretofore, a method has been developed for drying raw materials under reduced pressure to obtain porous dried foods, such as, for example, the reduced pressure fry drying method disclosed in Japanese Patent Publication No. 36892/1986.

Two types of apparatus have also been developed for carrying out the reduced pressure fry drying method, such as (1) an apparatus having a heat source arranged outside an oil tank and being adapted to circulate by a pump the oil between the heat source and the oil tank, and (2) an apparatus having a heat source such as a steam jacket arranged within the oil tank.

As previously mentioned, i is necessary to evaporate the greater part of the moisture in the raw materials to be removed as soon as possible after the commencement of the drying process However, since both the above apparatus (1) and (2) cannot rapidly evaporate the greater part of the moisture contained in the raw materials for following reasons, neither of the apparatus (1) and (2) can produce dried foods rich in porosity.

That is, the apparatus (1) cannot supply sufficient heat in a short time since it is in fact difficult to rapidly circulate the oil by the pump when the apparatus is in a reduced pressure condition. In the apparatus (2), it is practically difficult to uniformly mix the oil in a short time under reduced pressure conditions, and it is therefore impossible to evaporate the greater part of the moisture in the raw materials to be removed in a short time after the commencement of the frying process. This is so even though the temperature of the heat source such as the steam jacket is kept at a high temperature to raise the temperature of the oil which is in contact with the steam jacket. It is also practically difficult to mix this part of oil with the other part of oil in order to maintain the temperature of the entire oil at the temperature required for carrying out the reduced pressure fry. In addition, the apparatus (2) sometimes causes unevenness of fry in the products.

There is another method for carrying out the drying process under reduced pressure conditions other than the reduced pressure fry drying method, and that is the reduced pressure microwave drying method as, for example, disclosed in Japanese Laid-Open Patent Publication No. 265046/1986. However, this method often causes glow discharge which in turn causes injurious affects on the apparatus and a partial scorching on the dried foods, which in turn causes a deterioration (e.g. oxidization) of the dried foods. In addition, unevenness of dry has occurred due to unevenness in the distribution of microwaves.

Because of the need for keeping these problems of a minimum, it has heretofore been impossible to significantly increase the output power of the microwaves. As a result, it has been impossible to evaporate the greater part of the moisture in the raw materials to be removed in a short time after the commencement of the drying process, and thus this makes it impossible to manufacture dried foods which are rich in porosity.

SUMMARY OF THE INVENTION

Accordingly, it is an object of the present invention to provide a method and an apparatus which can evaporate the greater part of the moisture in the raw materials to be removed in as short a time as possible after the commencement of the drying process and therefore can manufacture dried foods giving the person who eats the dried foods a soft-dried and spongy feeling pleasant to the palate.

For achieving the object of the present invention, a method is provided for manufacturing dried foods by radiating raw food materials with microwaves under reduced pressure conditions while the raw food materials are immersed in oil, and an apparatus is further provided for manufacturing dried foods comprising an oil tank arranged within a pressure reducing chamber having a pressure reducing means, a retainer for containing raw food materials immersed in oil in said oil tank, and microwave radiating means for radiating said raw food materials with microwaves while immersed in the oil. According to the method and the apparatus of the present invention, it is possible to evaporate the greater part of the moisture in the raw materials to be removed in as short a time as possible after the commencement of the drying process, and it is therefore possible to manufacture dried foods rich in porosity. The presence of the oil causes little generation of glow discharge and the convection of the oil remarkably improves the evenness of the distribution of the microwaves. This makes it possible to increase the output power of the microwaves.

BRIEF DESCRIPTION OF THE DRAWINGS

Other objects and advantages of the present invention will become apparent from the following detailed description of the preferred embodiment of the present invention taken in reference to the accompanying drawing.

The drawing is a schematic view showing the general arrangement of the dried food manufacturing apparatus of the present invention.

DESCRIPTION OF THE PREFERRED EMBODIMENT

Firstly, the method for manufacturing the dried foods will be described. The basic process of the method of the present invention is firstly to pretreat the raw food materials, then to immerse the raw food materials in the oil and to radiate the raw materials with microwaves under reduced pressure, and finally to carry out after-treatment.

Any solid food material can be used for the raw food material. Examples of these raw food materials are the following: seeds and nutlets, beans, fish and shellfish, meat of animals, birds and whales, vegetables, fruits, mushrooms, seaweed, processed foods made of flour such as noodles, pasta and the like, processed foods made of soybean, processed foods of made egg such as fried eggs and the like, processed foods made of milk such as cheese and the like, processed foods made of the meat of domestic animals such as sausage, ham and the like, processed foods of made fish such as boiled fish paste (e.g. the Japanese foods "kamaboko" and "chikuwa"), gelled foods such as jelly, devil's-tongue (the Japanese food "konnyaku") and the like, and processed foods made of rice such as rice cake (the Japanese food "mochi") and the like.

The pretreatment process is optional and can be carried out by properly selecting one or more from the following operations (1)–(6) based upon the kind of raw materials and the nature of the dried foods:
(1) freezing treatment,
(2) preparatory dry hot blow dry, freezing dry, sunlight dry, reduced pressure dry, and microwave dry,
(3) immersion into solutions the object of the immersion is to add seasoning to the raw material and also to prevent the raw material from deterioration in quality.

Examples of dissolved substances monosaccharide, disaccharide, oligosaccharide, polysaccharide, thick malt syrup, dextrin, corn syrup, saccharogenic starch, sugar alcohol, antioxidant, phosphoric acid, and common salt,
(4) cutting,
(5) peeling, and
(6) cooking (boiling, frizzling and the like).

In the process of radiating the raw materials with microwaves while immersed in oil under reduced pressure, the temperature of the oil (at the commencement of the drying process and during the drying process) is about 70°–130° C., the range of the reduced pressure is about 500–15,000 Pa, and the output power of the microwaves is about 1.35–50 kw, which is properly selected based upon the amount of raw materials, etc. The drying period, i.e. the degree of dry, is properly selected based upon the kind of raw materials, the amount of raw materials, the temperature of the oil, the output power of the microwaves, the degree of pressure reduction, etc. In general, it is preferable, in order to have the dried foods rich in porosity, to continue the drying process until 80 or more weight-% of the moisture contained in the raw food materials is removed.

The aftertreatment process is also optional and can be carried out by properly selecting one or more from the following operations (1)–(4):
(1) oil draining (preferably carried out under reduced pressure),
(2) finish dry hot blow dry, freezing dry, reduced pressure dry, sunlight dry, microwave dry, and reduced pressure fry dry,
(3) flavoring, and
(4) seasoning.

An apparatus for manufacturing the dried foods of the present invention will next be described with reference to the attached drawing. A cover 2 of a pressure reducing chamber 1 having a monitoring window 3 is mounted on the upper portion of the pressure reducing chamber 1. The pressure reducing chamber 1 is provided with an oil tank 4 in which is arranged a table 6 on which a retainer 5 for containing the raw food materials is placed. The table 6 is mounted so that it can rotate and vertically move within the oil tank 4, and it may also be provided with agitation blades 7 for agitating the oil in the tank 4.

There is no special limitation on the configuration of the retainer 5, and it may be a box-shaped configuration as shown in the drawings or a bag-shaped configuration. The retainer 5 can be made of metal or other suitable materials through which microwaves are easily permeable. If the retainer 5 is made of a metal such as stainless steel, sufficiently large openings should be formed therein so the microwaves can permeate therethrough. Materials through which microwaves are easily permeable are, for example, polycarbonate, fluoroplastic, polypropylene, polyester, etc.

The oil tank 4 is provided with a steam jacket 8 and a steam delivering pipe 8a. Both the steam jacket 8 and the steam delivering pipe 8a are used for raising the temperature of the oil in the oil tank 4 at the commencement of drying operation to a predetermined temperature, and are also used as auxiliary heat sources during the drying operation. A separate heat source may be arranged outside the oil tank 4 instead of, or together with, the steam jacket 8 and the steam delivering pipe 8a so as to circulate the oil between the oil tank 4 and the heat source. In another simple way, it may be possible to introduce the oil heated to a predetermined temperature to the oil tank 4.

The pressure reducing chamber 1 is further provided with a microwave radiating means 9 (the preferred embodiment shown in the drawing has two microwave radiating means 9). Each microwave radiating means 9 comprises a microwave oscillator 11, a waveguide 10 and a microwave radiating port 19. The microwave radiating port 19 can be arranged at a desired position. However, it is preferable to arrange the port 19 at a position higher than the oil level (O.L.) to avoid the difficulty of sealing it. In such case, it is desirable to mount the microwave radiating means 9 such that the incident angle of the microwaves relative to the oil surface (O.L.) is set within a range of 10°–90° C. (preferably a range of 45°–80° C.). In addition, it is preferable to symmetrically arrange a plurality of the microwave radiating ports 19 so as to uniformly heat the oil. In such case, it may be possible to construct the apparatus so that the microwaves can be delivered to all ports 19 from a single microwave oscillator 11 via a plurality of waveguides 10 each extending between the ports 19 and the oscillator 11.

The pressure reducing chamber 1 is further provided with a pressure reducing means 12 for creating a reduced pressure condition in the chamber 1. The pressure reducing means 12 comprises a suction pump 13, a refrigerator 14 and a pressure reducing control valve 15. The pressure in the chamber 1 is also controlled by a pressure controlling leak valve 20. The oil tank 4 is provided with an oil purifying means 16 formed by a strainer 17 and a circulating pump 18 for removing suspended matter in the oil. A thermometer for measuring oil temperature may be arranged at a desired position in the oil tank 4. It is preferable to use an optical fiber thermometer to prevent the thermometer from being affected by the microwaves. Of course, other types of thermometers than the optical fiber thermometer can be used if the sensor portion and the lead wire portion of the thermometer are protected from the microwaves by metallic covers.

When measuring the average temperature of the entire oil by using an optical fiber thermometer, it is preferable to mount the optical fiber thermometer on the turntable 6 via a slip ring to prevent twisting of the optical fiber. The detected temperature may be used for controlling the output power of the microwaves.

The operation of the dried food manufacturing apparatus of the present invention will be hereinafter described. Firstly, opening the cover 2, the table 6 is elevated above the oil level (O.L.) and the retainer 5 in which the raw food materials are contained is placed on the table 6. Then the cover 2 is closed and the pressure reducing chamber 1 is evacuated to a predetermined pressure by the pressure reducing means 12. The table 6 is lowered until the retainer 5 is completely immersed in the oil and then rotated. By this time, the temperature of the oil should have been raised to the predetermined temperature by the steam jacket 8 and the steam delivering pipe 8a. Simultaneously with the immersion of the retainer 5 in the oil, the microwave radiating means 9 are energized to radiate the raw materials in the retainer 5 with microwaves.

Thus, the raw food materials can be dried. During the drying operation, the degree of reduced pressure in the chamber 1 is kept within a predetermined range by the pressure reducing control valve 15 and the pressure controlling leak valve 20. After completion of the drying process, the radiation of microwaves is stopped. Then the table 6 is elevated above the oil level (O.L.) and is rotated and/or vertically reciprocated to drain the oil from the finished dried food contained in the retainer 5. Then the cover 2 is opened and the retainer 5 containing the finished dried food therein is taken from the pressure reducing chamber 1. Finally, the used oil is purified by circulating the oil to the strainer 17 by the circulating pump 18.

Following is a comparison between finished dried foods made by the method according to the present invention (Experimental Example 1) and other methods not according to the present invention (Comparative Examples 1–3).

Prior to carrying out the drying process of the raw food material, a pretreatment was carried out as follows. Apples were selected as the raw food material. Each of the apples was cut in four pieces after having been washed by water. Then, after having removed the core from the pieces, they were sliced into apple chips each having a thickness of 5–6 mm. The sliced apple chips were then immersed into syrup (aqueous solution including 15% sucrose and 0.5% sodium L-ascorbinate). Then a vacuum replacement treatment (i.e. reducing the pressure from normal pressure to 2,660 Pa during two minutes with the apple chips immersed in the syrup and after keeping this pressure for five minutes, gradually recovering to the normal pressure over five minutes) was carried out. Finally, taking the apple chips out from the syrup, the syrup was drained from the apple chips by a centrifugal separator.

(EXPERIMENTAL EXAMPLE 1)

The apple chips (100 g) pretreated as abovementioned were placed in the metal retainer 5 formed with a great many of apertures and then the retainer 5 was placed on the table 6. The pressure in the chamber 1 was reduced to a pressure of 2,660 Pa and the temperature of the oil was initially set at 90° C. Then, the table 6 was lowered into the oil and radiated with microwaves of an output power of 3.0 kw simultaneously with the immersion of the retainer 5 into the oil. After a lapse of three minutes, the radiation of microwaves was stopped. Then, as a finish dry, the apple chips were kept under reduced pressure at the set temperature of 90° C. for three minutes (i.e. "reduced pressure fry drying"), the retainer 5 was elevated and taken out from the oil and was kept stationary there for three minutes to drain the oil from the dried foods in the retainer 5. Finally, by recovering to normal pressure, the dried apple chips were completed.

(COMPARATIVE EXAMPLE 1)

The apple chips (100 g) pretreated as abovementioned were placed in the metal retainer 5 formed with a great many apertures and the retainer 5 was placed on the table 6. The pressure in the chamber 1 was reduced to a pressure of 2,660 Pa and the temperature of the oil was initially set at 90° C. Then the table 6 was lowered into the oil and immersed in the retainer 5 containing the apple chips for fifteen minutes. Then the retainer 5 was elevated and taken out from the oil and was kept stationary there for three minutes to drain the oil from the dried foods in the retainer 5. Finally, by recovering to normal pressure, the dried apple chips were completed.

(COMPARATIVE EXAMPLE 2)

The apple chips (100 g) pretreated as abovementioned were placed in the retainer 5 made of polycarbonate and the retainer 5 was placed on the table 6. The pressure in the chamber 1 from which the oil had been taken out was reduced to a pressure of 2,660 Pa and then the apple chips were radiated by microwaves of an output power of 1.5 kw. The operation of microwave radiation was intermittently carried out as follows to prevent the apple chips from being unevenly dried. That is, after repeating five times a pattern of five minutes microwave radiation and ten minutes stoppage, the microwaves were continuously radiated for ten minutes. The dried apple chips were thus completed by recovering to normal pressure after having kept the apple chips stationary for thirty minutes.

(COMPARATIVE EXAMPLE 3)

The apple chips (100 g) pretreated as abovementioned were placed in the retainer 5 made of polycarbonate and the retainer 5 was placed on the table 6. The pressure in the chamber 1 from which the oil had been taken out was reduced to a pressure of 2,660 Pa and then the apple chips were radiated by microwaves of an output power of 3.0 kw. The operation of microwave radiation was separately carried out as follows to prevent the apple chips from unevenly drying. That is, after three minutes of microwave radiation, the microwave radiation was stopped for ten minutes. Then after repeating four times a pattern of two minutes microwave radiation and four minutes stoppage, the microwaves were continuously radiated for one minute. The dried apple chips were thus completed by recovering to normal pressure after having kept the apple chips stationary for thirty minutes.

The conclusion derived from comparing the quality of the dried apple chips manufactured according to the methods of Experimental Example 1 and Comparative Examples 1–3 is as follows:

In the dried apple chips manufactured by the method of Experimental Example 1, all the apple chips were moderately dried and no volume reduction of any apple chips due to drying were found therein. The color of the dried apples was maintained in their good original color and no scorching was found therein. The flesh of the apple chip was porous over the entire volume thereof, and therefore the feeling it gave to the palate was soft-dry and spongy.

In the dried apple chips manufactured by the method of Comparative Example 1, all the apple chips were moderately dried. However, a slight volume reduction was found therein and the color was slightly darkened. Several large apertures like blisters were formed in the flesh of the apple chips, and therefore the distribution of pores was not even. In addition, oily brown scorchings were found thereon. The feeling to the palate was soft, but was inferior in lightness and meltability in the mouth.

In the dried apple chips manufactured by the method of Comparative Example 2, 30% of the apple chips were moderately dried. However, the other 40% were not dried yet, and the remaining 30% were remarkably scorched and had undergone remarkable volume reduction. Also in the remaining 30%, the color of the apple chips was darkened and the distribution of pores was not even. In addition, although the feeling to the palate was soft, it lacked both lightness and meltability in the mouth. Also, there was a hard dried part and a moist part in the finished dry food.

In the dried apple chips manufactured by the method of Comparative Example 3, 30% of the apple chips were moderately dried. However, 10% were not dried yet and the remaining 60% were remarkably scorched and had undergone to remarkable volume reduction. Also in the remaining 60%, the color of the apple chips was darkened and even distribution of pores was not found therein. In addition, although the feeling to the palate was soft, it lacked both lightness and meltability in the mouth, and there was a hard dried part and a moist part in the finished dry food. Furthermore, glow discharge frequently occurred after the third microwave radiation and thus the retainer of polycarbonate was deformed and the bolts in the oil tank were also partially discolored and melted.

Evaluation with respect to volume reduction, color, porosity and feeling to the palate were made only on the moderately dried apple chips.

It is apparent from the comparison between the Experimental Example according to the present method and the Comparative Examples not according to the present method that the present method is excellent in manufacturing dried foods. This is because the greater part of the moisture in the raw materials to be removed can be evaporated in a short time after the commencement of the drying process according to the present invention.

According to the present invention, it is possible to manufacture dried foods rich in porosity by radiating the raw food materials with microwaves while immersed in oil under reduced pressure conditions.

The dried foods manufactured by the present invention can be eaten as is or after swelling them with water or boiled water.

While a preferred embodiment of the present invention has been described in detail, it will be understood that various modifications and alternations of the two rotors may be made without departing from the spirit and scope of the present invention as set forth in the appended claims.

What is claimed is:

1. A method for manufacturing dried foods by radiating raw food materials with microwaves while immersed in oil under reduced pressure conditions.

2. A method according to claim 1 wherein the temperature of said oil is about 70°-130° C.

3. A method according to claim 1 wherein the output power of said microwaves is about 1.35-50 kw.

4. A method according to claim 1 wherein the degree of said reduced pressure is within a range of 500-15,000 Pa.

5. A method according to any one of claim 1 wherein said raw food material is one or more selected from the group consisting of seeds and nutlets, beans, fish and shellfish, meat of animals, birds and whales, vegetables, fruits, mushrooms, seaweed, processed made foods of flour, processed foods made of soybeans, processed foods made of eggs, processed foods made of milk, processed foods made of meat of domestic animals, processed foods made of fish, gelled foods and processed foods made of rice.

6. A method according to claim 1 wherein said microwave radiating process on the raw food materials under the reduced pressure is carried out until 80 or more weight-% of moisture contained in said raw food materials is removed.

7. An apparatus for manufacturing dried foods, comprising:
 a pressure reducing chamber at least partially defined by an oil tank;
 a pressure reducing means associated with the pressure reducing chamber;
 a retainer for containing raw food materials immersed in oil in said oil tank; and
 a microwave radiating means for radiating said raw food materials with microwaves while immersed in the oil.

8. An apparatus according to claim 7 wherein said pressure reducing means comprises a suction pupm, a refrigerator, and a pressure-reducing control valve.

9. An apparatus according to claim 7 wherein said oil tank is provided with a table which is rotatable and vertically movable.

10. An apparatus according to claim 7 wherein said oil tank is provided with a steam jacket.

11. An apparatus according to claim 7 wherein said oil tank is provided with a steam delivering pipe.

12. An apparatus according to claim 7 wherein said microwave radiating means has a plurality of microwave radiating ports.

13. An apparatus according to claim 12 wherein said plurality of microwave radiating ports are arranged at positions symmetrical to each other.

* * * * *